A. P. COCHRANE.

KNOCKDOWN CONTAINER.

APPLICATION FILED MAR. 17, 1917.

Reissued May 1, 1917.

14,294.

4 SHEETS—SHEET 1.

Inventor
Albert Paul Cochrane

By his Attorney
J. Rundenberg

THE NORRIS PETERS CO., PHOTO-LITHO., WASHINGTON, D. C.

A. P. COCHRANE.

KNOCKDOWN CONTAINER.

APPLICATION FILED MAR. 17, 1917.

Reissued May 1, 1917.

14,294.

4 SHEETS—SHEET 2.

Inventor

Albert Paul Cochrane

By his Attorney

J. B. Sandenburg

THE NORRIS PETERS CO., PHOTO-LITHO., WASHINGTON, D. C.

A. P. COCHRANE.

KNOCKDOWN CONTAINER.

APPLICATION FILED MAR. 17, 1917.

Reissued May 1, 1917.

14,294.

4 SHEETS—SHEET 3.

Inventor

Albert Paul Cochrane

By his Attorney

J. E. Rauchenberg

THE NORRIS PETERS CO., PHOTO-LITHO., WASHINGTON, D. C.

A. P. COCHRANE.

KNOCKDOWN CONTAINER.

APPLICATION FILED MAR. 17, 1917.

Reissued May 1, 1917.

14,294.

4 SHEETS—SHEET 4.

Inventor
Albert Paul Cochrane

By his Attorney
G. G. Sandenberg

THE NORRIS PETERS CO., PHOTO-LITHO., WASHINGTON, D. C.

UNITED STATES PATENT OFFICE.

ALBERT PAUL COCHRANE, OF BROOKLYN, NEW YORK, ASSIGNOR TO JANE HARTLEY COCHRANE, OF NEW YORK, N. Y.

KNOCKDOWN CONTAINER.

14,294. Specification of Reissued Letters Patent. Reissued May 1, 1917.

Original application filed June 21, 1913, Serial No. 774,981. Renewed November 26, 1915, Serial No. 63,676. Original No. 1,195,908, dated August 22, 1916. Application for reissue filed March 17, 1917. Serial No. 155,585.

*To all whom it may concern:*

Be it known that I, ALBERT PAUL COCHRANE, a citizen of the United States, and a resident of the borough of Brooklyn, in the county of Kings and State of New York, have invented a certain new and useful Improvement in Knockdown Containers, of which the following is a specification.

This invention relates to improvements in knock-down containers and particularly to packing cases adapted to be used in the transportation of merchandise and returned in a "knock-down" condition.

The objects of the invention are, to provide receptacles capable of containing goods to which they may be adapted, secure from loss and injury during transportation of merchandise and storage, which, after use, may be taken apart or separated into distinct elements susceptible of being packed into a small compass for return to the shipper.

A second object is to provide means combined with such receptacles whereby they are held securely in erected or container condition when so desired.

As hereinafter appearing, these main ends are attained by the combination of separable wall or side members having inward projecting flanges or abutments at the edges, and pyramidal fastenings for the apical corners comprising inner and outer portions with means for uniting them so as to consolidate the separable sections into a trussed structure of extreme rigidity. In this way a box may be built up of six entirely separate and distinct sides or sections, securing the maximum in simplicity, compactness and strength. The flanges may consist simply of straight marginal portions of the sheet material of the sections bent inward at right angles to the planes of the corresponding sides, so as to produce an angular overlapping at the junction when the box is set up and to permit of nesting when it is taken apart. In the simplest and most complete embodiment of the invention, therefore, the sections take the form of shallow trays. By the term "pyramidal fastenings" I do not necessarily mean such as are actually pyramidal in form, since that is immaterial, but fastenings which are virtually pyramidal, as to structural effect, being adapted each for coöperation with three intersecting planes or sides, so as to secure in conjunction with the abutments a peculiarly solid staying of the structure. The corner fastenings also discharge the functions of corner reinforcements, raise the bottom of the box slightly so that means may be inserted beneath it in loading and unloading, and may also serve as sliding supports obviating the use of skids or rollers for moving it about.

A third object is to combine with the container a locking device also operative as a reversible metallic tag which may have inscribed permanently on its opposite sides the addresses of the consignor and consignee respectively, thereby assuring safety to the goods and a correct destination of the container.

These and other allied objects are attained by the novel construction and arrangement of parts hereinafter described and shown in the accompanying drawings, forming part of this specification, and in which.

Figure 2:
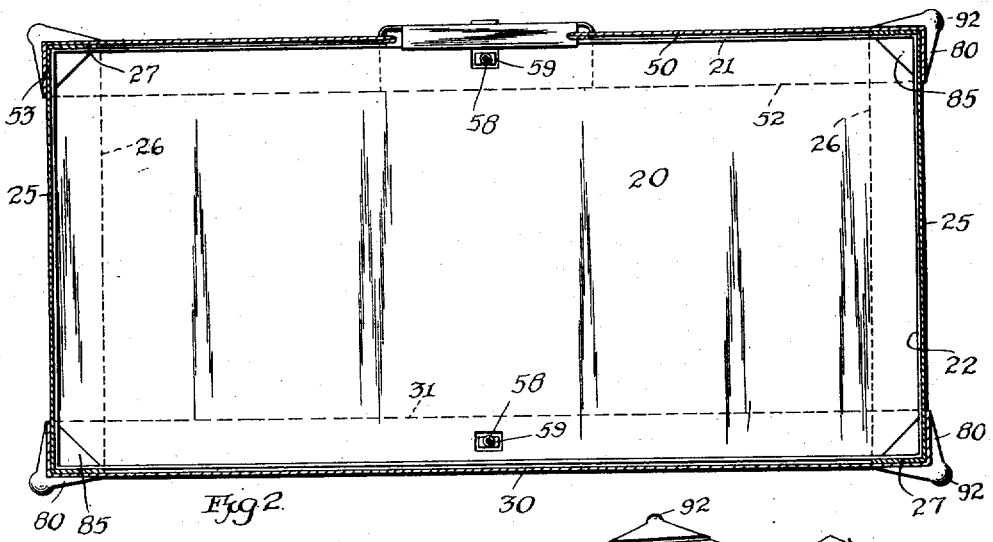
Fig. 2 is a longitudinal section of the same taken on line 2—2 of Fig. 1.
Figure 1:
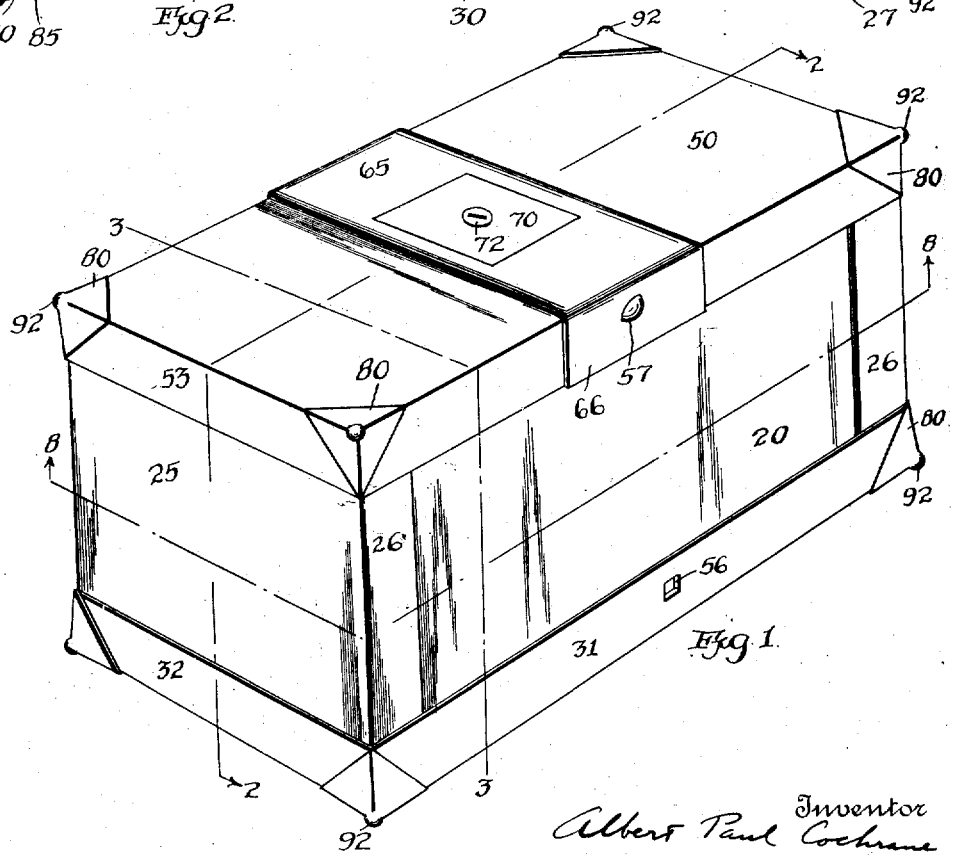
Figure 1 is a perspective view of a container made in accordance with the invention.
Figure 4:
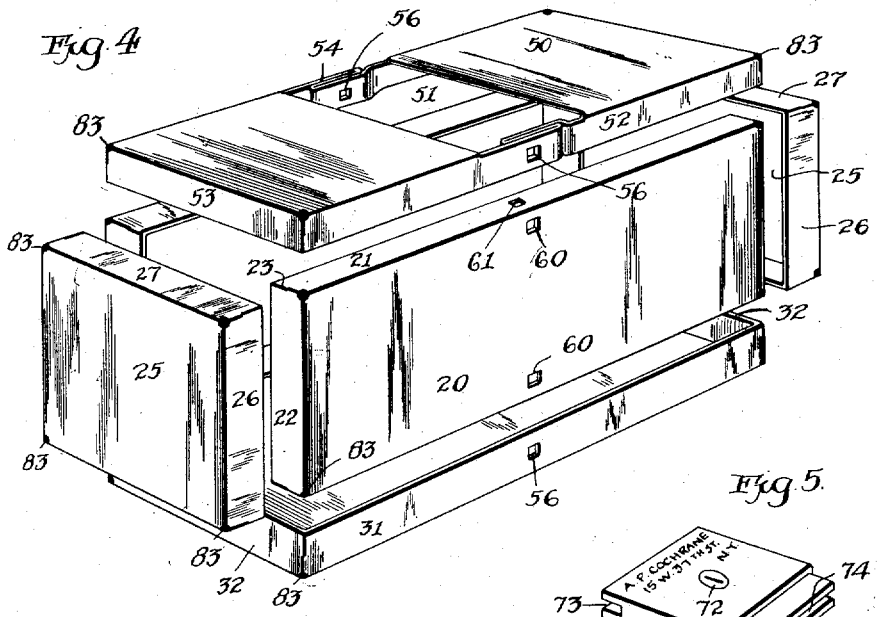
Fig. 4 is a perspective view of the several parts in detail, showing the assemblage relation.

The invention comprises a pair of side plates 20 made of any suitable material, as sheet metal, fiber or the like, having flanges 21 along the sides and similar flanges 22 at the ends, forming in effect shallow rectangular trays. The end members 25 are formed in like manner with side and top flanges 26 and 27 respectively and so proportioned as to receive the ends of the side members within the box-like structure presented. It may be stated here that the invention comprehends a reversal of these positions, that is to say, in some shapes of containers, it may be considered desirable to insert the end members within the side members in place of the foregoing method of assemblage. Either method provides a relatively rigid four-sided structure, open at the top and bottom, easily assembled or dismounted; to this is applied a bottom plate 30 shaped to the requisite size and having its edges 31 and 32 flanged.

Figure 10:
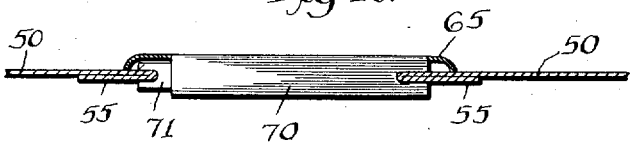
Fig. 10 is a fragmentary sectional view taken on line 10—10 of Fig. 8.
Figure 11:
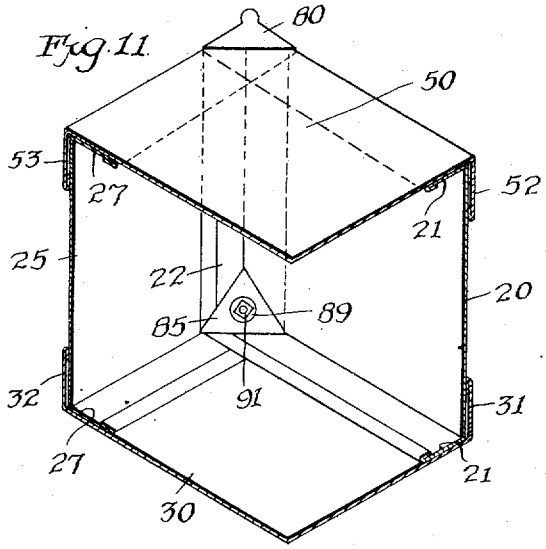
Fig. 11 is a perspective view showing an upper and lower corner as completely formed with its attachments.

The top cover 50 is formed in the same manner with flanges 52 and 53 and is further provided with an opening 51 extending laterally across from side to side within the flanged portions midway of the plate; the flanged sides 52 on the top cover are reinforced by seaming in such manner as to produce three thicknesses of material along the center portion 54 of the same, the opening 51 being made sufficiently wide to permit of the metal being so disposed and a further allowance is provided to allow the edges of the opening to be doubled as shown at 55 in Fig. 10. The inturned marginal flanges or abutments of the sections may be made in various ways, of one or more thicknesses, and the adjoining ends of flanges of the same section may be suitably united if so desired. The simple, straight, right-angular flanges of the drawings are desirable for reasons heretofore indicated.

Figure 5:
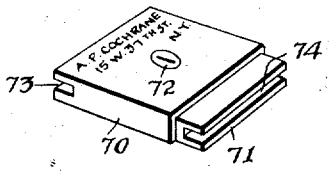
Fig. 5 is a perspective view of the locking-tag showing the bolt extended.
Figure 3:
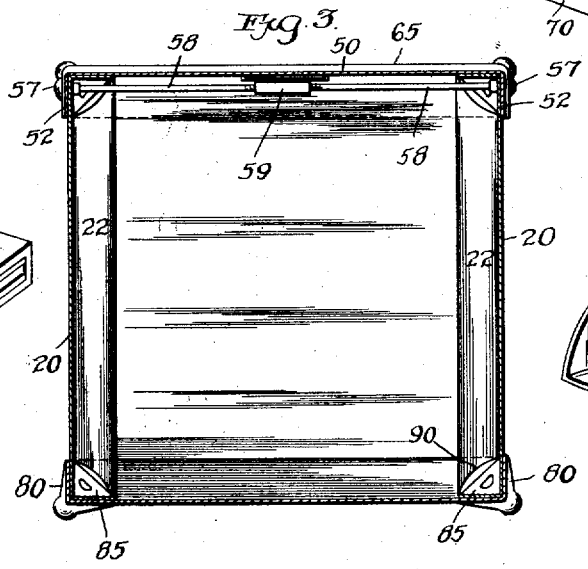
Fig. 3 is a cross-section of the same taken on line 3—3 of Fig. 1.
Figure 6:
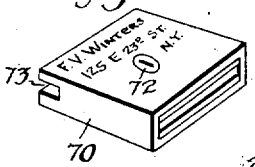
Fig. 6 is a similar view of the same showing the bolt retracted, and the tag reversed.
Figure 7:
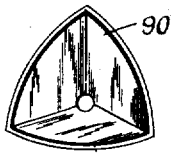
Fig. 7 is a perspective view of an interior corner washer in detail.
Figure 8:
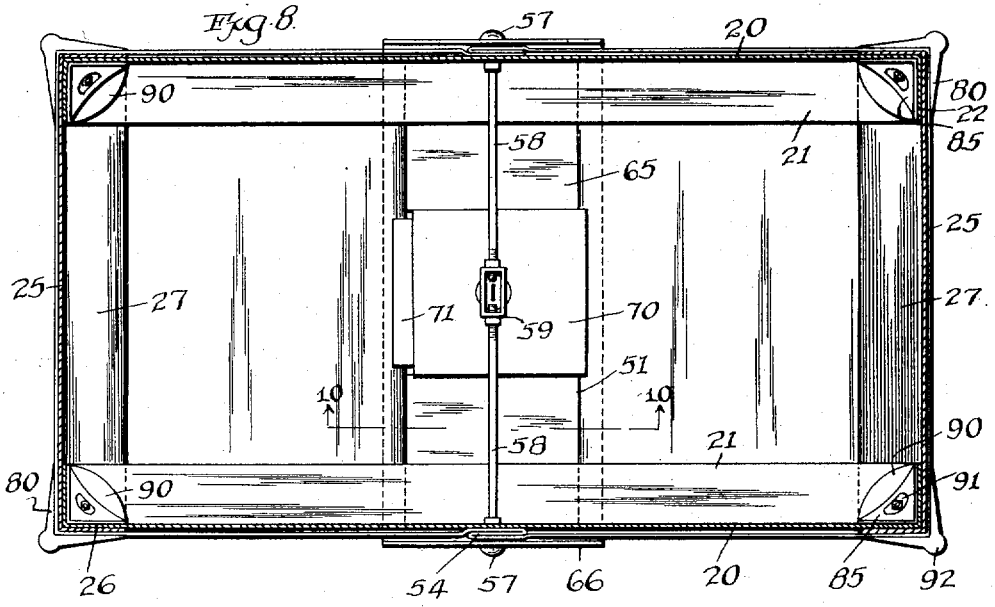
Fig. 8 is a sectional view looking upward on line 8—8 of Fig. 1.
Figure 9:
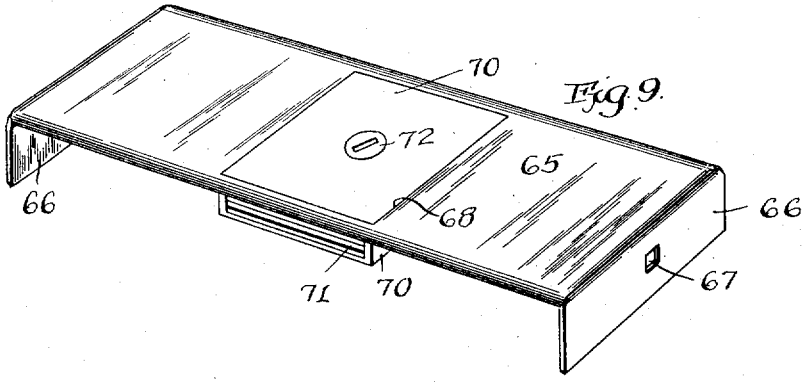
Fig. 9 is a perspective view of a removable cover plate including the lock-tag.
Figure 12:
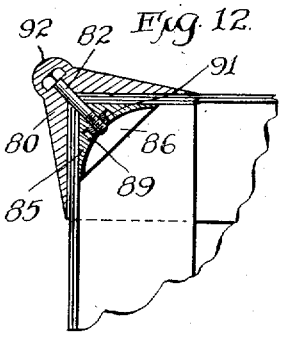
Fig. 12 is a sectional view taken diagonally through a corner showing one form of construction.
Figure 13:
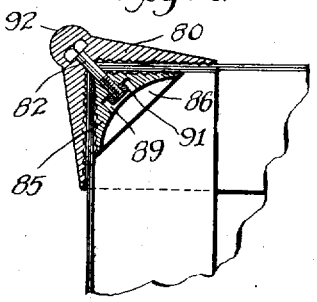
Fig. 13 is a similar view showing a slightly modified construction.
Figure 14:
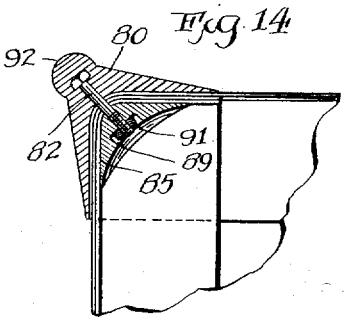
Fig. 14 is another like view further modified.
Figure 16:
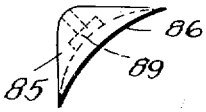
Fig. 16 is a plan view of the exterior corner element.
Figure 15:
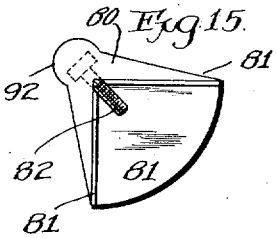
Fig. 15 is a plan view of the interior corner element indicated in Fig. 14.

Suitable openings 56 are made through the flanges 31 and 52 to receive the square shanks of bolts having heads 57 and stems 58 screw-threaded at their inner ends, the same being adapted to engage with the turnbuckles 59 so that the bolts may be stressed to add to the rigidity and security of the box, though their presence is by no means essential. There may be one or two of these turn-buckle ties, at the top only or at top and bottom. Other openings 60 are provided in the side plates 20 to properly register with the mentioned openings 56 and still other openings 61 are formed through the flanges 21 through which the bolts are passed when the structure is dismantled and the side elements nested in the cover members. Covering over the opening 51 is a plate 65 having its ends 66 turned down and fitted over the cover sides 52 so that the opening 56 registers with the opening 67 to receive the bolt 58. In the center of the plate 65 is a rectangular opening 68 adapted to receive the body 70 of a reversible lock having a wide bolt or slidable member 71 operated by a key through the escutcheon 72. This lock is further provided with a groove 73 formed longitudinally across the end of the body member 70, a similar groove 74 also being formed in the end of the bolt 71; these grooves are adapted to engage with the folded edges 55 of the opening in the upper cover plate 50 and at the same time the body 70 extends upward into the opening formed in the removable plate 65. Thus it will be seen that all openings are fully covered and secured, and that by releasing the lock it can be removed so as to obtain access to the turnbuckles 59 in adjusting the same, and furthermore, as the lock body is adapted to bear an address on each side, it being reversible, that a correct, and permanent, address is had both of the consignor and consignee; this lock-tag is shown in detail in Figs. 5 and 6. Over each corner on the outside is attached a metal member 80 having three angular projections 81 adapted to engage with two vertical sides and the upper or lower surface adjacent, in other words a virtually pyramidal cap. These members contain each the head of a short bolt 82 which extends diagonally from the inner corner of the apex and is adapted to pass through appropriate openings 83 formed in the extreme corners of the structure and also through an inner metal member 85 having three angular faces presented to the interior corner; this inner member is formed preferably with a concave face 86 having a central recess 89 adapted to receive a nut 91 fitting the mentioned bolt with sufficient space to operate a wrench in adjusting the same. This construction is clearly indicated in Fig. 12, while in Fig. 13 a modified form of metal corners is presented having on their respective engaging surfaces a series of sharp projections or serrations adapted to engage with the material used in the construction. Another modification is present in Fig. 14, in which the plate ends are curved, thus avoiding sharp cornered construction; in all these the same arrangement of securing-bolt is used and with any of them may be used a liner or washer 90 formed from a circular disk, as shown in Fig. 7, of any desired material, preferably of an elastic or yielding nature so that it may readily conform to the interior corners even if somewhat irregular. Surrounding the heads of the bolts 82 are knobs of metal 92, the same extending diagonally outward beyond the structure so that the same rests upon these knobs in whatever position the structure may be placed and acting in the manner of casters, thereby facilitating moving the receptacle.

In assembling the container, the side and end sections 20 and 25 are fitted together and into the bottom section 30. The outer and inner portions 80 and 85 of the four lower corner fastenings are then applied solidly against the outside and inside apical corners, the bolts or connecting portions thereof being passed diagonally through the corners in the registering openings 83. The nuts 89 are then screwed on and the fastenings drawn up tight. In this operation it will be observed that they grip the angularly overlapped regions of the box sections, clamping these together and obtaining purchase thereon, so that the sections are most firmly united and pulling apart thereof or pulling out of the fastenings is rendered impossible. The flanges or abutments enable the sections to be mutually staying and thus additionally coöperate with the pyramidal fastenings to produce a structure of extraordinary rigidity and strength.

After the body of the container has been packed the cover section 50 is put on, and the four top corner fastenings are applied and clamped as already described in reference to the lower corners. The plate 65 is then placed over the opening in the cover, the top turn-buckle tie 58, 59 is adjusted, and finally the lock 70 is placed in the opening in plate 65, and its bolt projected so as to hold it in place and thereby prevent unauthorized access to either the screw members of the corner fastenings or the turn-buckle.

In dismounting the container, the lock-tag is first removed, after which the turn-buckle and bolt are taken off, permitting removal of the plate 65. The four top corner fastenings can now be unscrewed from the inside, and the cover 50 removed. When the contents have been taken out, the lower corner fastenings can be separated. At this time the box is entirely in pieces. To dispose these separated sections compactly for return shipment the sections 20 can be placed telescopically edge up within the top and bottom members respectively, while disposed between are the end members. In this condition the turn-buckle bolts may be passed through the registering openings in the flanges of the nested sections, as suggested by the openings 56 and 61, to hold the members together.

Obviously minor changes may be made from the exact construction indicated without departing from the general scope of the invention. In the claims it will be understood that the term "side sections" is used generically, and does not refer specifically to the sections 20.

Having thus described my invention, what I claim as new and desire to secure by Letters Patent, is:

1. A container comprising the combination of separable side sections having inward projecting abutments at the edges, and pyramidal corner fastenings comprising inner and outer portions with means for uniting them diagonally through the apical corners.

2. A container comprising the combination of separable side sections having inward projecting abutments at the edges, and corner clamps comprising each a cap formed to bear upon the three outside faces meeting at the corner, an inner portion, and a portion passing diagonally through the apical corner in suitable openings provided therefor in the sections.

3. A container comprising the combination of separate and distinct side sections having inward projecting abutments at the edges whereby they fit into each other when set up and nest when collapsed, and pyramidal clamping fastenings for the apical corners.

4. A container comprising the combination of separate and distinct tray-like side sections having straight perpendicular flanges and registrable openings at the corners, and fastenings for the apical corners of the set-up box comprising inner and outer bearing portions, each engaging three surfaces, and diagonal connecting portions passing through said openings.

5. A container comprising the combination of separable side sections, abutments projecting inward from edges of said sections, and pyramidal fastenings for the apical corners comprising inner and outer members adapted to grip the sections and abutments, and connecting portions adapted to pass diagonally through openings provided therefor at the extreme corners.

6. A container comprising separable wall sections each having an inturned flange extending around the same and provided with openings at the corners adapted to aline with one another when the sections are set up, and fastening means passed through said alined openings.

7. In a container of the class described, the combination of separable wall sections including a top section having an opening therein, means accessible through said opening for securing the sections together, and means to close said opening comprising a lock having a groove in its edge opposite its bolt for engaging one edge of said opening, said bolt adapted to engage below the opposite edge of said opening.

8. In a container of the class described, the combination of separable wall sections including a top section having an opening therein, means accessible through said opening for securing the sections together, and means to close said opening comprising a reversible lock having a groove in its edge opposite its bolt for engaging one edge of said opening, said bolt also having a groove in its end to engage the opposite edge of said opening, whereby said lock may be applied with either side out for the purpose specified.

9. In a container of the class described, the combination of separable wall sections, including a top section having an opening extending across the same, an auxiliary cover section to close the opening in the top section and having an opening therein, means accessible through the opening in the top section when the cover section is removed for securing the wall sections together, means accessible through the opening in the cover section when the same is in place for securing said cover section to the wall sections, and a lock adapted to fill the opening in the auxiliary cover section and prevent access to the securing means.

10. In a container of the class described, the combination with separable base, side, end and top sections each having a right-angularly turned flange extending around its margin, the base and top sections being of a size to fit over the other sections after the end sections have been slipped over the ends of the side sections in erecting the container, of means for fastening said sections together comprising virtually pyramidal corner fastenings composed of inner and outer members united diagonally through the apical corners.

ALBERT PAUL COCHRANE.

Copies of this patent may be obtained for five cents each, by addressing the "Commissioner of Patents, Washington, D. C."